United States Patent [19]

Wojdylo

[11] Patent Number: 4,820,247
[45] Date of Patent: Apr. 11, 1989

[54] EMERGENCY V-BELT

[76] Inventor: Henry K. Wojdylo, 2421 Ala Wai Blvd., Ste. 2006-A, Honolulu, Hi. 96830

[21] Appl. No.: 146,741

[22] Filed: Jan. 21, 1988

[51] Int. Cl.$^4$ .............................................. F16G 3/00
[52] U.S. Cl. .................................... 474/255; 24/31 L
[58] Field of Search ................................ 474/253–257; 24/31 L, 31 W, 304; 198/844, 847; 428/58, 60

[56] References Cited

U.S. PATENT DOCUMENTS

| | | | |
|---|---|---|---|
| 1,452,704 | 4/1923 | Poulin et al. | 474/253 |
| 2,566,262 | 8/1951 | Traxler | 474/255 |
| 3,693,218 | 9/1972 | Jaubert et al. | 198/844 X |
| 3,783,704 | 1/1974 | Lawson | 474/254 |
| 3,945,263 | 3/1976 | Simonsen et al. | 474/255 X |
| 4,279,676 | 7/1981 | Morrison et al. | 474/254 X |
| 4,435,457 | 3/1984 | Servo et al. | 428/60 X |
| 4,596,540 | 6/1986 | F'Geppert | 474/253 |
| 4,637,810 | 1/1987 | Beck | 474/253 |
| 4,650,446 | 3/1987 | Pinto et al. | 474/253 |

Primary Examiner—Jerome W. Massie, IV
Assistant Examiner—Matthew Smith
Attorney, Agent, or Firm—Henderson & Sturm

[57] ABSTRACT

A replacement drive belt construction (10) comprising a drive belt member (11) a reinforcing cable member (12) a cable locking member (13) and securing means (14) wherein the cable locking member (13) secures the free ends (21) of the cable member (12) together; and, wherein the securing means (14) attaches the free ends (16) of the belt member (11) together.

1 Claim, 1 Drawing Sheet

EMERGENCY V-BELT

TECHNICAL FIELD

The present invention relates generally to endless drive belts and more specifically to a method and apparatus for creating an endless drive belt of a given length for use in an emergency situation.

BACKGROUND OF THE INVENTION

The present invention was the subject matter of DDP Registration No. 171644 which was filed in the U.S. Patent Office on June 10, 1987.

As can be seen by reference to the following U.S. Pat. Nos: 4,637,810; 4,596,540; 3,783,704; and, 1,452,704 the prior art is replete with myriad and diverse closed loop drive belt constructions. While all of the aforementioned prior art constructions are more than adequate for the particular purpose and function for which they were specifically designed, these devices do not represent the complete body of drive belt constructions worthy of patent protection.

Anyone who has experienced a drive belt failure on a piece of machinery realizes the hopeless and frustrating feelings that result from the knowledge that all productive and useful activity will be suspended until such time as a new drive belt can be substituted for the broken one. In addition, the owner or operator of the machinery is also faced with the normally labor intensive and time consuming chore of removing at least one of the drive pulleys on the machinery, so that the new drive belt may be installed, and then replacing the drive pulley so that the machinery may operate in its intended manner.

Obviously, those individuals who are most involved with belt driven machinery are only too acutely aware of the fact that a new replacement drive belt construction would have to be developed to overcome the deficiencies found in the prior art constructions.

BRIEF SUMMARY OF THE INVENTION

The present invention involves a replacement drive belt construction comprising in general: a belt member; a reinforcing cable member; a cable locking member; and, a securing means.

As will be explained in greater detail further on in the specification, the belt member is split wherein the split ends of the cable member are configured and dimensioned to overlap one another over a substantial portion of their respective lengths. In addition, the split ends of the cable member are provided with a plurality of recesses which are dimensioned to receive portions of the reinforcing cable member and the cable locking member in their assembled relationship.

The reinforcing cable member comprises an elongated preferably braided cable element which forms the core of the belt member; wherein, the free ends of the cable member are dimensioned to project beyond the split ends of the belt member prior to the operative assembly of the new device belt construction.

The cable locking member comprises a deformable collar element which is dimensioned to receive the free ends of the cable member; whereupon, the collar element may be deformed such as by the use of a metal crimping tool, wherein the collar element will frictionally lock the ends of the cable member into a fixed position relative to one another.

The securing means comprises an adhesive coating that is provided on at least one of the split ends of the cable member; such that both of the split ends may be joined together in the final assembly of the new drive belt construction.

In as much as this new drive belt construction is intended for assembly in the field, the fact that the ends of the cable member are not initially joined together allows a workman to install the new drive belt construction on the machinery without the removal of one of the drive belt pulleys as would be the case with a prefabricated closed loop drive belt assembly.

It should also be noted that this invention also contemplates the oversizing of the drive belt member and the cable member; whereby, the user may selectively remove portions of the free ends of both the drive belt and cable members to produce individual emergency drive belt constructions having different dimensions.

Obviously, the customized sizing of the drive belts will require suitable cutting and crimping tools; however, tools of this type are to be commonly found in most automotive, household and workshop environments; and, this new drive belt construction can be sized and installed on machinery with only a penknife and a pair of pliers having a wire cutting capability as will be described later on in the specification.

BRIEF DESCRIPTION OF THE DRAWINGS

These and other objects, advantages, and novel features of the invention will become apparent from the detailed description of the best mode for carrying out the preferred embodiment of this invention which follows; particularly when considered in conjunction with the accompanying drawings, wherein.

BEST MODE FOR CARRYING OUT THE INVENTION

Figure 1:
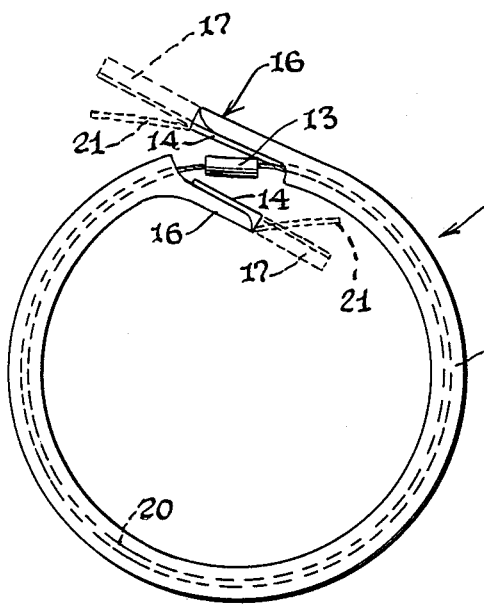
FIG. 1 is a front plan view of the new drive belt construction in the final stages of assembly.

As can be seen by reference to the drawings and in particular to FIG. 1, the new drive belt construction that forms the basis of the present invention is designated generally by the reference numeral (10). The drive belt construction (10) comprises in general: a belt member (11); a reinforcing cable member (12); a cable locking member (13); and, securing means (14). These structural components will no be described in seriatim fashion.

Figure 2:
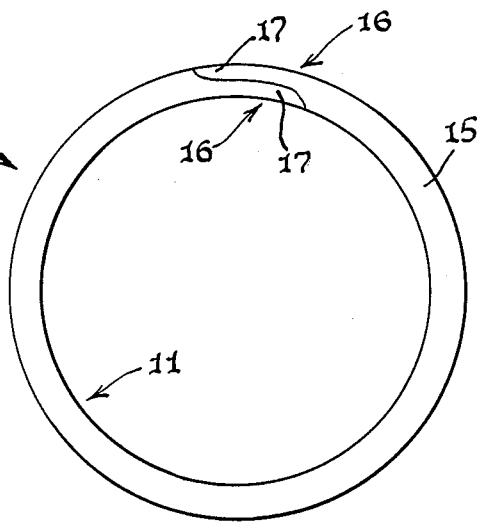
FIG. 2 is a front plan view of the new drive belt in its finished configuration.

As shown in FIGS. 1 and 2, the belt member (12) comprises an elongated generally elastomeric belt element (15) having free ends (16); wherein, each of the free ends (16) are provided with an elongated reduced thickness lip portion (17). In addition, the elongated lip portions (17) of the belt member (12) are further dimensioned to overlie one another in their operative disposition as depicted in FIG. 2; and, the interior surface (18) of the lip members (17) are further provided with a plurality of shallow recesses (19).

Figure 3:
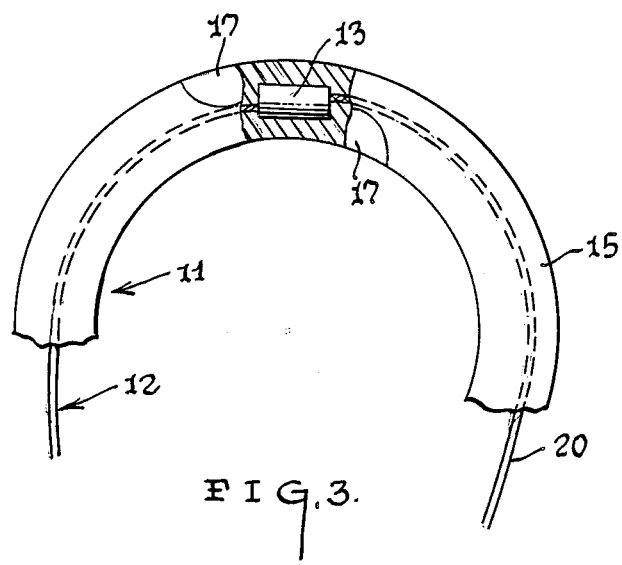
FIG. 3 is an enlarged detail view of the components of the new drive belt construction in its assembled mode.

As depicted in FIGS. 1 and 3, the reinforcing cable member (12) comprises an elongated cable element (20) that is centrally embedded in the belt member (12); wherein, the elongated cable element (20) is provided with free ends (21); and, the length of the cable element (20) is slightly greater than the length of the belt element (15) for reasons that will be explained shortly.

Figure 4:
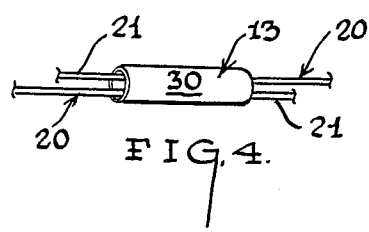
FIG. 4 is an enlarged detail view of the cooperation between the ends of the cable member and the cable locking member; and, FIG. 5 is an enlarged detail view of one of the split ends of the cable member.

Turning now to FIGS. 1, 3, and 4, it can be seen that the cable locking member (13) comprises a discrete deformable locking collar element (30) which is dimensioned to receive the free ends (21) of the elongated cable element (20); wherein, the walls of the locking collar element (30) may be crushed into frictional engagement with the free ends (21) of the cable element (20) in a well recognized manner; in order to form the cable element (20) into a closed loop reinforcing cable member (12) having a selected circumference.

Figure 5:
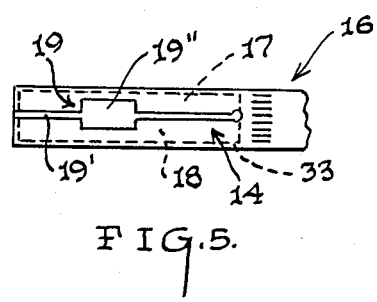

As shown in FIGS. 1 and 5, the securing means (14) of the preferred embodiment comprises a layer of adhesive (33) formed on at least one of the lip portions (17) of the belt member (11); wherein, both of the free ends of the belt member (11) may be joined together in a well recognized manner as depicted in FIG. 2.

As can also be seen by reference particularly to FIG. 5 the recesses (19) that are formed in the reduced dimension lip portions (17) of the free ends (16) of the belt member (15) comprise: an elongated narrow recess (19') which is dimensioned to receive a portion of one of the free ends (21) of the cable element (20); and, an enlarged recess (19") which is dimensioned to receive a portion of the locking collar element (30) of the cable locking member (13).

When a drive belt on a given piece of machinery needs to be replaced due to the structural failure, all that the operator of the machinery has to do to operatively deploy the new drive belt construction of this invention is to follow a few simple steps. To begin with as shown in FIG. 1, the split ends (16) of the new drive belt construction (10) are brought into an overlapping relationship to approximate as closely as possible the circumference of the drive belt that is to be replaced.

At this juncture the excess length of both the drive belt member (11) and the cable reinforcing member (12) are removed using a suitable conventional severing tool (not shown). The next step involves the insertion of the free ends (21) of the cable element (20) in opposite directions into the locking collar element (30); whereupon, the locking collar element (30) is engaged by a conventional crimping tool such that the circumference of the closed loop cable element (20) approximates the median circumference of the drive belt that is to be replaced. The final step in the assembly process involves the engagement of the interior surfaces (18) of the opposed lip portions (17) of the free ends (16) of the belt element (15) by virtue of the adhesive coating (33) that is formed on at least one of the ends (16) of the belt element (15).

It should also be emphasized at this juncture that the foregoing assembly of the new drive belt construction (10) of this invention may be accomplished without disassembling the machinery that was operatively connected to the original drive belt; in as much as, the new drive belt construction can be installed in the space formally occupied by the original drive belts initially open V-shaped configuration. Obviously, once the ends of the V-shaped configuration are operatively connected the drive belt (10) will define a closed loop drive belt configuration.

Having thereby described the subject matter of his invention it should be apparent that many substitutions, modifications, and variations of the invention are possible in light of the above teachings. It is therefore to be understood that the invention as taught and described herein is only to be limited to the breadth and scope of the appended claims.

I claim:

1. A replacement drive belt construction for broken drive belts wherein the drive belt construction comprises:

a drive belt member comprising an elongated belt element having free ends; wherein, the free ends of the belt element are provided with reduced thickness elongated lip portions which are dimensioned to overlie one another in their operative disposition;

securing means comprising a layer of adhesive deposited on at least one of the reduced thickness elongated lip portions of one of the free ends of the drive belt member wherein both of the free ends of the drive belt member may be joined together in their operative disposition;

a reinforcing cable member comprising an elongated cable element that is embedded in the elongated belt element wherein the cable element is provided with free ends that project out of the free ends of the elongated belt member; and, a cable locking member comprising a discrete deformable locking collar element; wherein, the locking collar element is dimensioned to receive the opposed free ends of the cable element; and, wherein the walls of the locking collar element are adapted to be crushed into frictional engagement with the free ends of the cable element relative to one another; wherein, said plurality of recesses comprise an elongated narrow recess that is dimensioned to receive a portion of one of the free ends of the cable elements; and, an enlarged recess that is dimensioned to receive a portion of the locking collar element.

* * * * *